United States Patent
Prasad et al.

(10) Patent No.: US 12,008,577 B2
(45) Date of Patent: Jun. 11, 2024

(54) SYSTEM AND METHOD FOR FACILITATING RECLAMATION REQUESTS

(71) Applicant: Visa International Service Association, San Francisco, CA (US)

(72) Inventors: Ranjiva Prasad, Hampshire (GB); Nidhi Kapoor, London (GB); Jake Butler, London (GB)

(73) Assignee: Visa International Association Service, San Francisco, CA (US)

( * ) Notice: Subject to any disclaimer, the term of this patent is extended or adjusted under 35 U.S.C. 154(b) by 602 days.

(21) Appl. No.: 17/055,932

(22) PCT Filed: May 21, 2019

(86) PCT No.: PCT/US2019/033283
§ 371 (c)(1),
(2) Date: Nov. 16, 2020

(87) PCT Pub. No.: WO2019/231758
PCT Pub. Date: Dec. 5, 2019

(65) Prior Publication Data
US 2021/0233076 A1 Jul. 29, 2021

Related U.S. Application Data

(60) Provisional application No. 62/678,856, filed on May 31, 2018.

(51) Int. Cl.
*G06Q 20/40* (2012.01)
*G06Q 20/04* (2012.01)
(Continued)

(52) U.S. Cl.
CPC ......... *G06Q 20/407* (2013.01); *G06Q 20/047* (2020.05); *G06Q 20/3276* (2013.01);
(Continued)

(58) Field of Classification Search
CPC .............. G06Q 20/407; G06Q 20/047; G06Q 20/3276; G06Q 30/0281; G06Q 90/20;
(Continued)

(56) References Cited

U.S. PATENT DOCUMENTS 8,234,206 B1 * 7/2012 Ogundipe .............. G06Q 40/10
705/37
2006/0167705 A1 7/2006 Ostlund
(Continued)

FOREIGN PATENT DOCUMENTS

GB 2525920 A * 11/2015 ............. G06Q 20/10
WO WO-2008049461 A1 * 5/2008 ............. G06Q 20/20
(Continued)

OTHER PUBLICATIONS

Baker C. Tax, VAT & Visas: What Connected Tech Ecosystems Can Do. Business Travel News. 2018 (Year: 2018).*
(Continued)

*Primary Examiner* — Maria C Santos-Diaz
(74) *Attorney, Agent, or Firm* — Kilpatrick Townsend & Stockton LLP

(57) ABSTRACT

Described herein are systems and techniques for facilitating reclamation requests. In this disclosure, a system is described in which information related to a number of transactions is received by a service computer. The service computer may determine what transactions, or portions thereof, are eligible for reclamation and to what extent. Once eligible transactions, or portions thereof, have been identified, the service computer may identify requirements for making a reclamation request. The service computer may then identify a client device associated with the eligible transactions, generate, and transmit notifications to the client device to facilitate the submission of a reclamation request.

19 Claims, 13 Drawing Sheets

(51) Int. Cl.
*G06Q 20/32* (2012.01)
*G06Q 30/02* (2023.01)
*G06Q 90/00* (2006.01)
*G06Q 30/012* (2023.01)

(52) U.S. Cl.
CPC ......... *G06Q 30/0281* (2013.01); *G06Q 90/20* (2013.01); *G06Q 30/012* (2013.01)

(58) Field of Classification Search
CPC .... G06Q 40/123; G06Q 40/10; G06Q 20/207; G06Q 40/00; G06Q 30/04; G06Q 30/06
See application file for complete search history.

(56) References Cited

U.S. PATENT DOCUMENTS

| | | | |
|---|---|---|---|
| 2009/0167705 A1* | 7/2009 | Chen ................ | G06F 3/04886 345/173 |
| 2011/0178861 A1* | 7/2011 | Georgi ................ | G06Q 30/02 705/14.25 |
| 2013/0151388 A1* | 6/2013 | Falkenborg ........... | G06Q 40/02 705/35 |
| 2015/0242832 A1* | 8/2015 | Corritori ............. | G06Q 20/207 705/19 |
| 2015/0324767 A1* | 11/2015 | Walsh .................... | G06Q 30/04 705/44 |
| 2016/0196617 A1* | 7/2016 | Saft ..................... | G06Q 20/207 705/31 |
| 2018/0165677 A1* | 6/2018 | Kohli .................. | G06Q 20/322 |
| 2019/0139105 A1* | 5/2019 | McGuire ............ | G06Q 30/0261 |

FOREIGN PATENT DOCUMENTS

| | | | |
|---|---|---|---|
| WO | 2011011227 | 1/2011 | |
| WO | 2011147912 | 12/2011 | |
| WO | WO-2011147912 A1 * | 12/2011 | ........... G06Q 20/207 |
| WO | WO-2014085619 A1 * | 6/2014 | ......... G06Q 10/0635 |
| WO | WO-2015009100 A1 * | 1/2015 | ............. G06Q 30/02 |
| WO | 2017010936 | 1/2017 | |
| WO | WO-2017010936 A1 * | 1/2017 | ........... G06Q 20/045 |
| WO | WO-2018217891 A1 * | 11/2018 | ....... G06F 16/90332 |
| WO | WO-2019235656 A1 * | 12/2019 | |

OTHER PUBLICATIONS

VAT Coordination in Common Markets and Federations: Lessons from the European Experience Symposium on Designing a Federal VAT Part II Cnossen, Sijbren (Year: 2009).*

The Future of Transaction Tax Management and Technology Indirect Tax: Technology Tax Walsh, Chris p. 67 (Year: 2012).*

EP19810948.0, "Extended European Search Report", dated Jul. 28, 2021, 9 pages.

SG11202011659R, "Written Opinion", dated Aug. 10, 2022, 9 pages.

Application No. PCT/US2019/033283, International Search Report and Written Opinion, dated Sep. 18, 2019, 13 pages.

* cited by examiner

FIG. 12

SYSTEM AND METHOD FOR FACILITATING RECLAMATION REQUESTS

CROSS-REFERENCE TO RELATED APPLICATIONS

This application is a 371 National Stage of International Application No. PCT/US2019/033283, International filing date May 21, 2019, which claims priority to U.S. Patent Application No. 62/678,856, filed on May 31, 2018, the disclosure of which are herein incorporated by reference in its' their entirety for all purposes.

BACKGROUND

Transactions conducted between resource providers in a particular region and users not resident to that region often include additional costs (e.g., taxes and fees) that the user should not be subject to. In these transactions, the user may be eligible to receive a reclamation (i.e., a reimbursement) of those additional costs. However, the process for making a reclamation claim can be complex and time consuming. Additionally, users may not be aware of certain requirements (such as reclamation eligibility rules for a particular location) at the time of purchase, which can result in those users becoming ineligible to make a reclamation request.

Furthermore, users are often unaware of particular eligibility requirements for making reclamation requests when traveling. This is especially true when a user travels to multiple states or locales within a region and the eligibility rules vary across those locales.

Embodiments of the invention address these and other problems, individually and collectively.

BRIEF SUMMARY

Embodiments of the invention are directed to systems and techniques for facilitating reclamation requests. In this disclosure, a system is described in which transaction requests (e.g., authorization request messages) are received by a service computer. From the received transaction requests, the service computer may determine what transactions, or portions thereof, are eligible for reclamation and to what extent. Once eligible transactions, or portions thereof, have been identified, the service computer may identify requirements for making a reclamation request. The service computer may then generate and transmit notifications to a user to facilitate the submission of a reclamation request.

One embodiment of the invention is directed to a method comprising receiving, from an access device at a service computer, an authorization request message comprising an access identifier and a resource provider identifier associated with a transaction, identifying a set of reclamation eligibility rules based on attributes associated with the access identifier and the resource provider identifier, determining, based on the identified set of rules, that the transaction is eligible for a reclamation, generating a notification message comprising a message indicating that the transaction is eligible for the reclamation, and transmitting the notification message to a mobile communication device associated with the access identifier.

Another embodiment of the invention is directed to a service computer comprising a processor and a memory including instructions that, when executed with the processor, cause the service computer to, at least receive an authorization request message comprising an access identifier and a resource provider identifier associated with a transaction, identify a set of reclamation eligibility rules based on attributes associated with the access identifier and the resource provider identifier, determine, based on the identified set of rules, that the transaction is eligible for a reclamation, generate a notification message comprising a message indicating that the transaction is eligible for the reclamation, and transmit the notification message to a mobile communication device associated with the access identifier.

These and other embodiments of the invention are described in further detail below.

BRIEF DESCRIPTION OF THE DRAWINGS

FIG. 12 depicts an illustrative process for obtaining reclamation credit in an automated reclamation request via a client device in accordance with at least some embodiments.

DETAILED DESCRIPTION

Figure 1:
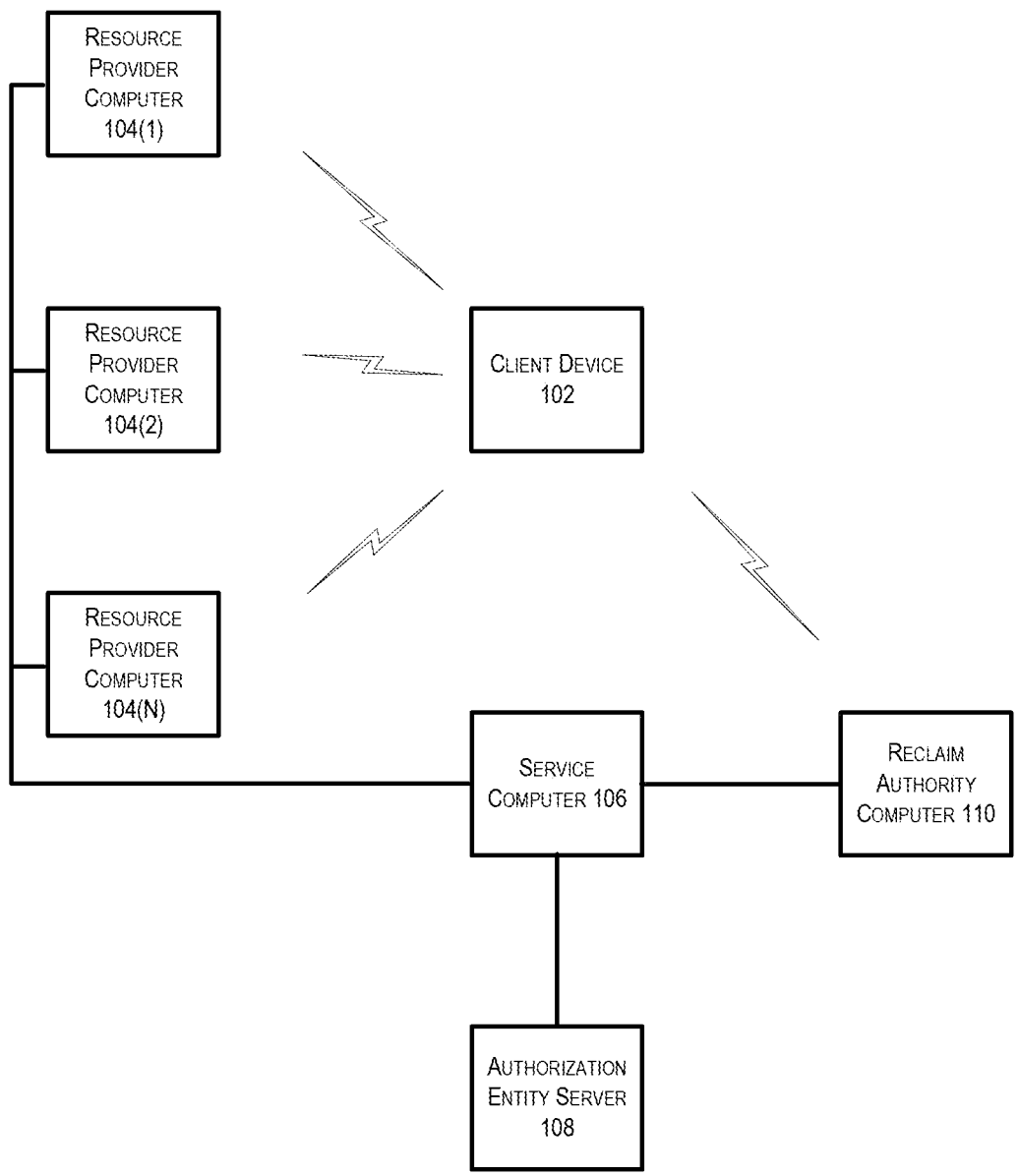
FIG. 1 depicts an illustrative example of a system for identifying potential reclamations and generating reclamation vouchers in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to systems, methods, apparatuses, and computer readable media for facilitating the submission of reclamation requests. In some embodiments, the disclosure is directed to providing timely notifications to a user when the user has conducted a transaction which is eligible for reclamation. In these embodiments, it may be necessary that the user receive the notification before he or she leaves the point of sale, as it may become difficult to obtain the required information once the user has left the point of sale. Hence, it should be noted that the timeliness of the notification may be a key requirement of the system. The system described herein is configured to provide notifications in accordance with the timeliness required.

In some embodiments, the disclosure is directed to providing instructions for making a reclamation request at a particular egress location. This may involve determining that an egress event is about to occur as well as identifying an appropriate egress location. Once identified, the system described herein is able to identify procedures specific to that egress location and generate a notification to the user that includes those instructions. In some embodiments, the notification may include routing instructions intended to guide a user to a reclamation authority in order to make a request.

Prior to discussing embodiments of the invention, description of some terms may be helpful in understanding embodiments of the invention.

An "access device" may be any suitable device that provides access to a remote system. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device.

An "authorization request message" may be an electronic message that requests authorization for a transaction. In some embodiments, it is sent to a transaction processing computer and/or an issuer of a portable device to request authorization for a transaction. An authorization request message according to some embodiments may comply with ISO 8583, which is a standard for systems that exchange electronic transaction information associated with a payment made by a user using a portable device or account. The authorization request message may include an issuer account identifier that may be associated with a portable device or account. An authorization request message may also comprise additional data elements including one or more of: a service code, a CVV (card verification value), a dCVV (dynamic card verification value), a PAN (primary account number or "account number"), a token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the resource provider's access device (e.g. POS equipment) that indicates approval of the transaction.

An "authorization entity" may be an entity that authorizes a request. Examples of an authorization entity may be an issuer, a governmental agency, a document repository, an access administrator, etc. An "issuer" may typically refer to a business entity (e.g., a bank) that maintains an account for a user. An issuer may also issue account credentials stored on a user device, such as a cellular telephone, smart card, tablet, or laptop to the user. In some embodiments, the authorization entity may be a server operated by a transaction processing network on behalf of an issuer. For example, the transaction processing network may maintain stand-in-processing (STIP) rules that are enforced by the transaction processing network to authorize requests when the issuer is unavailable.

A "reclamation authority" may be any entity responsible for reimbursing at least a portion of the value of a transaction. In some embodiments, a reclamation authority may be a government entity such as a customs organization or a tax authority. Reclamation authorities for a particular region may be based at an egress location.

The term "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may be a good or service, a physical building, a computer account or file, or a payment account. In some embodiments, a resource may refer to a financial product, such as a loan or line of credit.

A "resource provider" may be an entity that can provide a resource such as goods, services, information, and/or access to such a resource. Examples of a resource provider include merchants, online or other electronic retailers, access devices, secure data access points, etc. A "merchant" may typically be an entity that engages in transactions and can sell goods or services, or provide access to goods or services. A "resource provider computer" may be any computing device operated by a resource provider.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

A "service computer" or "service provider computer" may include any system associated with an entity that provides a resource or service. In some embodiments, the service computer may handle functionality of a computer application associated with the entity that provides the resource or service. The service computer may provide any suitable service. For example, the service computer may be a merchant, a utility company, a payment processing network, a wallet provider, a merchant, a website operator, or a bank.

A "transaction" may be any interaction or exchange between two or more parties. For example, a transaction may include a first entity requesting resources from a second entity. In this example, the transaction is completed when the resources are either provided to the first entity or the transaction is declined.

A "user" may include an individual. In some embodiments, a user may be associated with one or more personal accounts and/or mobile devices. The user may also be referred to as a cardholder, account holder, or consumer.

FIG. 1 depicts an illustrative example of a system for identifying potential reclamations and generating reclamation vouchers in accordance with at least some embodiments. In some embodiments, the depicted system may be configured to identify potential reclamations in real time and provide timely notifications. In some embodiments, the system may be configured to automatically detect an egress attempt and to provide instructions for processing a reclamation voucher specific to an egress location. In FIG. 1, a client device 102 is depicted as communicating with a number of resource provider computers 104. Each of the resource provider computers 104 may be in communication with a service computer 106. The service computer 106 may be configured to route transaction information from each of the resource provider computers 104 to an authorization entity computer 108. In some embodiments, the service computer 106 may also communicate with a reclaim authority computer 110.

The client device 102 may be any electronic device capable of communicating with a service computer 106 and/or a number of resource provider computers 104. In some embodiments, the client device 102 may be a mobile device (e.g., a smart phone). The client device 102 may be configured to communicate with a resource provider computer 104 via a contactless element. In some embodiments, the client device 102 may include a contactless element that may be used to communicate with the one or more resource provider computers 104. In some embodiments, the client device 102 may include a mobile application that causes the client device 102 to communicate with a service computer 106.

The service computer 106 may be any computing device capable of performing at least a portion of the functionality described herein. In some embodiments, the service computer 106 may receive information related to transactions conducted at one or more resource provider computers 104. The service computer 106 may identify any information included in the transaction information that pertains to potential reclamations, and, estimate an amount to be associated with the reclamation information. The service computer 106 may be configured to track and compile reclamation information pertaining to each of the resource providers 104. In some embodiments, the service computer 106 may be configured to generate and provide a notification to a client device 102 upon determining that a transaction has been conducted by a user of that client device 102 that includes reclamation information. The service computer 106 may also be configured to generate, with respect to each of the resource providers, a voucher that includes the reclamation information for that resource provider.

In some embodiments, the service computer 106 may be configured to detect an egress event and provide instructions to the client device for redeeming a reclamation value is accordance with information about an egress location. In some embodiments, a geographic location of the client device 102 may be reported to the service computer 106. The service computer 106 may determine that the client device 102 is approaching a geographic location associated with an egress location and/or that a scheduled egress event is approaching. The service computer 106 may then generate and provide instructions to the client device 102 that provides an operator of the client device with routing information for redeeming the reclamation information.

A resource provider computer 104 may be any computing device operated by, or on behalf of, a resource provider. In some embodiments, a resource provider computer 104 may be configured to control access to one or more resources. For example, a resource provider may be a merchant or other seller of goods and/or services. In this example, the resource provider computer 104 may be a point of sale (POS) device (e.g., a register).

In some embodiments, the resource provider computer 104 may be configured to communicate with a client device 102 via an access device. An access device may be any suitable device capable of communicating with the portable device 102 and the resource provider computer 104. In some embodiments, an access device may include a card reader or other electronic reader, which may include a contactless element.

An authorization entity server 108 may be any computing device operated by, or on behalf of, an authorization entity. In some embodiments, an authorization entity may be an issuer or other entity configured to authorize transactions. In some embodiments, the authorization entity may provide authentication for a payment device (e.g., a credit card).

By way of illustrating at least some interactions that may occur between the various components depicted in FIG. 1, consider the following use case scenario. An operator of the client device 102 may wish to conduct a transaction with a resource provider 104. For example, the operator of the client device 102 may wish to purchase goods or services from a merchant (the resource provider). In this example, the operator may present a payment device to the merchant to pay for the goods and/or services. In some embodiments, the payment device may be implemented on the client device 102. In other embodiments, the payment device may be implemented on a separate device from the client device 102. The merchant, upon receiving the payment information, may generate an authorization request message to be routed through a transaction processing network to an authorization entity 108 associated with the presented payment device. In this example, the service computer 106 may be implemented within, or in communication with, the transaction processing network used to route the authorization request message. The service computer 106 may parse the authorization request message, and using a set of rules that pertain to a location in which the transaction is conducted as well as information about the operator of the client device, determine what goods and/or services are eligible for a reclamation from the transaction. In this example, if the service computer 106 determines that at least some portion of the transaction is eligible, then the service computer 106 may generate a notification to be provided to the client device 102 indicating such. In this example, the notification may identify the eligible goods and/or services and may include instructions for redeeming the reclamation in the future. By way of further illustration, the notification may include wording such as "Please ask the merchant to give you a voucher for X so that you can recover any excess taxes or fees paid," where X is a list of the eligible goods and/or services.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
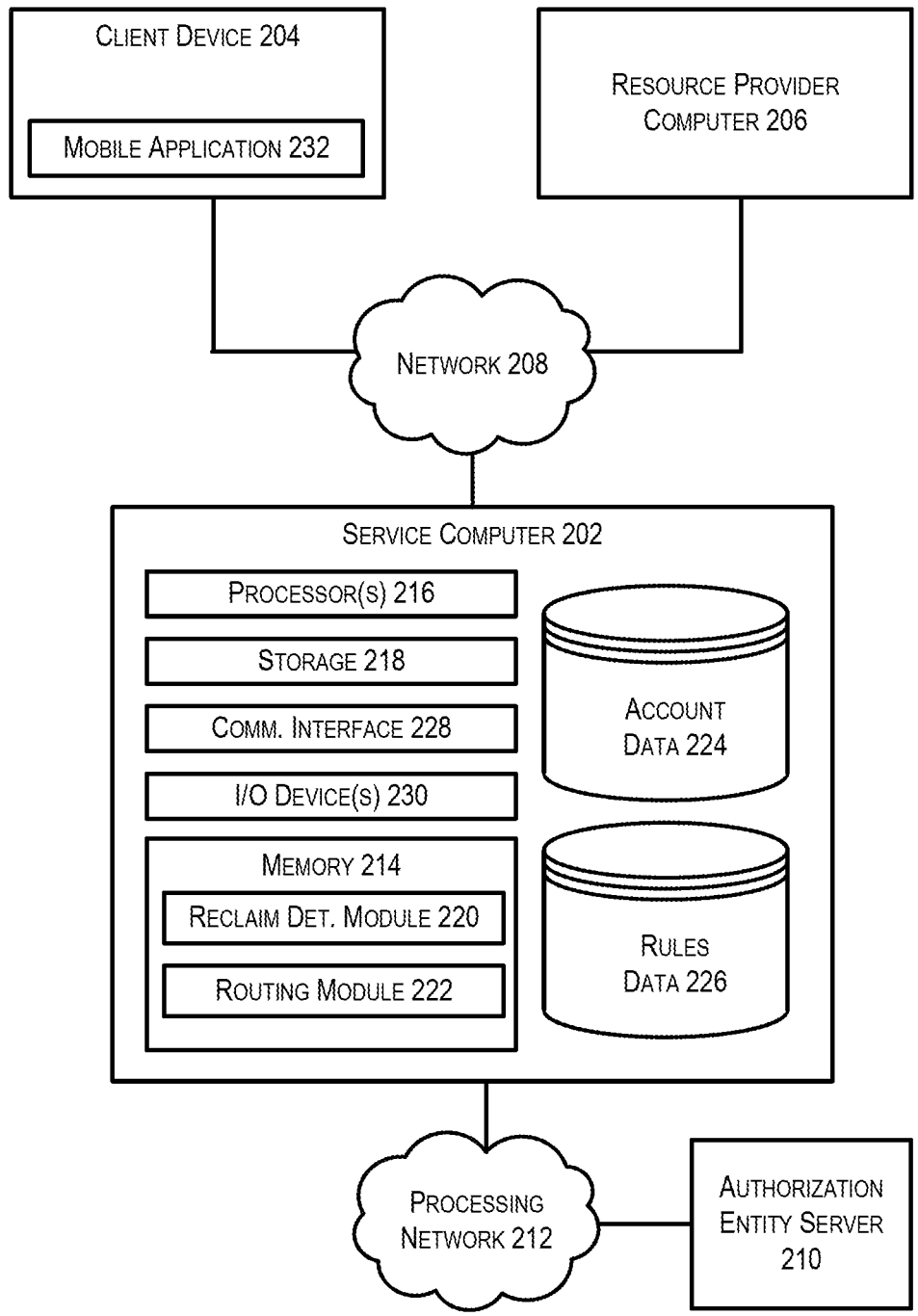
FIG. 2 depicts an example system architecture that may be implemented to facilitate reclamations for eligible transactions in accordance with embodiments of the disclosure.

FIG. 2 depicts an example system architecture that may be implemented to facilitate reclamations for eligible transactions in accordance with embodiments of the disclosure. The system architecture 200 is depicted as including a service computer 202, which may be an example of service computer 106 depicted in FIG. 1. The service computer 202 may be in communication with a number of client devices 204 as well as resource provider computers 206 via a network 208. Additionally, the service computer 202 may be in communication with a number of authorization entities 210 via a transaction processing network 212.

In at least some embodiments, the service computer 202 may include at least one memory 214 and one or more processing units (or processor(s)) 216. The processor(s) 216 may be implemented as appropriate in hardware, computer-executable instructions, firmware or combinations thereof. Computer-executable instruction or firmware embodiments of the processor(s) 216 may include computer-executable or machine executable instructions written in any suitable programming language to perform the various functions described. Additionally, it should be noted that in some embodiments, the service computer 202 may be embodied by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

The memory 214 may store program instructions that are loadable and executable on the processor(s) 216, as well as data generated during the execution of these programs. Depending on the configuration and type of service computer 202, the memory 214 may be volatile (such as random access memory (RAM)) and/or non-volatile (such as read-only memory (ROM), flash memory, etc.). The service computer 202 may also include additional storage 218, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the memory 214 may include multiple different types of memory, such as static random access memory (SRAM), dynamic random access memory (DRAM) or ROM. Turning to the contents of the memory 214 in more detail, the memory 214 may include an operating system and one or more application programs or services for implementing the features disclosed herein including at least a module for determining eligibility of reclamation information within conducted transactions (reclamation detection module 220) and/or a module for generating instructions to enable a user to make reclamations with respect to a particular egress location (routing module 222). The memory 214 may also include account data 224, which provides data associated with one or more accounts, as well as rule data 226, which provides data indicating eligibility requirements for various regions and/or resources.

The memory 214 and the additional storage 218, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the client device 204, resource provider computer 206, the service computer 202, or any other suitable computing device. The service computer 202 may also contain a communication interface 228 that allow the service computer 202 to communicate with a stored database, another computing device or server, user terminals, and/or other devices on the network(s) 208. The service computer 202 may also include input/output (I/O) device(s) and/or ports 230, such as for enabling connection with a keyboard, a mouse, a pen, a voice input device, a touch input device, a display, speakers, a printer, etc.

Turning to the contents of the memory 214 in more detail, the memory 214 may include an operating system and one or more application programs or services for implementing the features disclosed herein including at least a reclamation detection module 220 and/or a routing module 222 as well as account data 224 and/or rules data 226. Stored data (e.g., account data 224 and/or rules data 226) may comprise any suitable persistent data storage system. In some embodiments, the data may be stored in a database. Information stored in a database may be accessed by the one or more modules via a database query or any other suitable data retrieval means.

In some embodiments, the reclamation detection module 220 may, in conjunction with the processor 204, be configured to detect potential reclamation information within a number of conducted transactions. In some embodiments, reclamation information may be any information that pertains to taxes or fees that are attached to a transaction for which a consumer of the transaction should not be subject. Reclamation eligibility may vary based on the nationality of the consumer as well as the region in which the transaction is conducted. In some embodiments, reclamation eligibility will vary based on an amount of a transaction, an amount for one or more items in the transaction, a type of item in the transaction, or any other suitable transaction-related information. To determine reclamation eligibility, the reclamation detection module 220 may identify rules within the rules data 226 that pertain to the transaction. For example, upon receiving an authorization request message for a transaction, the reclamation detection module 220 may query the rules data 226 for any rules that pertain to a geographic region in which the transaction has taken place as well as the individual consumer that conducted the transaction. Upon receiving a response to that query, the reclamation detection module 220 may identify all potential reclamation material in the transaction by applying the returned rules to the information in the transaction. For example, the reclamation detection module 220 may determine that various additional fees charged for a particular item are eligible for reclamation, as well as determine an amount of reclamation which is eligible.

In some embodiments, the reclamation detection module 220 may be further configured to, in conjunction with the processor 204, generate a notification to be provided to a client device 204. In some embodiments, the reclamation detection module 220 may receive authorization requests submitted to an authorization entity for approval. The reclamation detection module 220 may identify reclamation material at that time (i.e., after the transaction has been initiated but before the transaction has been approved). The reclamation detection module 220 may then identify an amount that may be reclaimed, identify a mobile device (i.e., a client device) associated with the consumer of the transaction, and provide a notification to that consumer via the identified mobile device to make the consumer aware of any actions that need to take place at the time of the transaction. For example, upon detecting that a voucher may be needed in order to make a reclamation request at a later date, the reclamation detection module 220 may generate a notification to "request a voucher for this transaction from the clerk," and push that notification to the mobile device. In some embodiments, a version of the message may be presented in a language associated with the region in which the transaction has taken place.

In some embodiments, the routing module 222 may, in conjunction with the processor 216, be configured to detect an egress event and provide instructions for making a reclamation request in accordance with that detected egress event. In some embodiments, the routing module 222 may determine, based on location data received from a client device 204, a scheduled departure, or some combination of factors, an indication that a particular user is about to depart a region. In some embodiments, the routing module 222 may determine an egress location (a.k.a., a point of egress or departure point). Some non-limiting examples of an egress location may include a train station, an airport, a ferry terminal, a border crossing, or any other suitable location that provides an ability for departure from the current region. In some embodiments, the routing module 222 may provide a notification to the user via the client device 204 in order to confirm the egress event.

Once the routing module 222 has detected an egress event, the routing module 222 may be further configured to identify a likely egress location associated with the egress event. In some embodiments, the likely egress location may be determined based on information associated with a scheduled departure which has been provided by the user. In some embodiments, the likely egress location may be determined based on a geographic location of the client device 204 and/or a velocity of the client device 204. For example, if the location of the client device 204 indicates that the client device is moving toward a particular airport, then that airport may be identified as the likely egress location. The routing module 222 may then retrieve reclamation request instructions specific to that egress location. For example, upon determining that the user is likely to depart the region from a particular airport, the routing module 222 may retrieve information related to a layout of that airport which includes a location of a reclaim authority agent at that airport. The routing module 222 may then be configured to provide route guidance information to the client device 204 that guides the user to the reclaim authority agent. In some embodiments, the routing module 222 may also provide instructions to the user for making a reclamation request.

As described above, the client device 204 may be any electronic device capable of communicating with a service computer 202 and/or a number of resource provider computers 206. In some embodiments, the client device 204 may be a mobile device (e.g., a smart phone). Additionally, at least a portion of the functionality described herein may be implemented via a mobile application 232 installed upon, and executed from, the client device 204. Mobile application 232 may represent a set of computer-executable instructions that, when executed by the client device 204, cause the client device to establish a communicative session with the service computer 202 as well as to perform one or more of the functions described herein.

Figure 3:
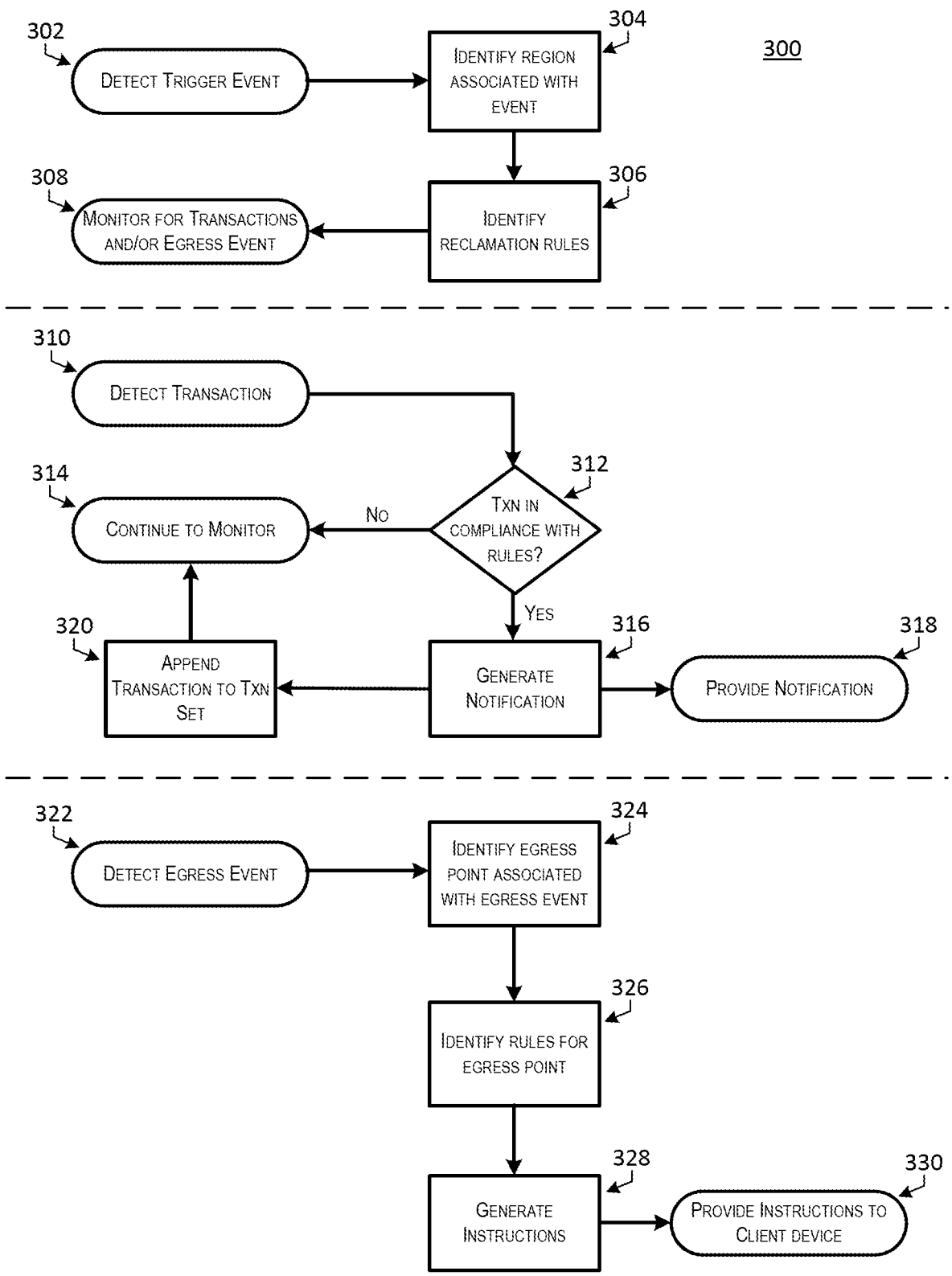
FIG. 3 depicts a process flow for providing reclamation notifications as well as providing instructions for making reclamation requests in accordance with at least some embodiments.

FIG. 3 depicts a process flow for providing reclamation notifications as well as providing instructions for making reclamation requests in accordance with at least some embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more processing devices configured with executable instructions and may be implemented as code (e.g., executable instructions, one or more computer programs or one or more applications). In accordance with at least one embodiment, the process 300 of FIG. 3 may be performed by at least the service computer 202 depicted in FIG. 2. The code may be stored on a computer-readable storage medium, for example, in the form of a computer program including a plurality of instructions executable by one or more processors. The computer-readable storage medium may be non-transitory.

Process 300 may begin at 302, when a trigger event is detected. In some embodiments, a trigger event may be any event that may be used to determine that a particular user is in a situation which may warrant making a reclamation request. For example, a trigger event may be detected when a payment device associated with a user is used to complete a transaction in a region in which that user does not reside. In a second example, a trigger event may be detected when a travel itinerary is received from a travel agency, accommodation provider (e.g., hotel), travel provider (e.g., airline), or other suitable entity. In some embodiments, future transactions by that user may be monitored for potential reclamation information upon detecting the trigger event.

At 304, the process may involve identifying a region associated with the trigger event. In some embodiments, this region may be a geographic region in which the trigger event occurred (e.g., a region in which the transaction took place). Once the region has been identified, the process may involve identifying a number of reclamation rules to be applied to future transactions at 306. In some embodiments, the rules may include rules specific to the identified region, rules specific to one or more classes to which the user belongs, or some combination of rules.

At 308, the process may involve monitoring transactions conducted by a user for potential reclamation information as well as for a potential egress event. It should be noted that a single user may be associated with a number of different payment devices. The system described herein may monitor transactions related to each of those payment devices and may compile reclamation information identified for each of them.

At 310, the process may involve detecting a transaction during its monitoring process. In some embodiments, this may involve receiving an authorization request message from a resource provider in relation to a transaction to be completed. The system may determine, based on a payment device associated with the authorization request message, that the authorization request message is associated with a particular user. Upon determining that the authorization request message is associated with a user for which transaction information is being monitored, the system may perform the following.

Upon detecting a transaction associated with a user for which monitoring has been initiated, the system may determine whether the transaction was conducted within the region identified at 304. Provided that the transaction is conducted within that region, the process may involve determining whether one or more portions of the transaction are in compliance with one or more of the identified rules at 312. For example, the process may involve identifying each of the resources in a purchase transaction and determining, for each of those resources, whether the identified rules permit the user to reclaim some portion of the value paid in the transaction. If no portions of the transaction are eligible for reclamation, then the process may involve continuing to monitor for transactions/egress events at 314.

At 316, the process may involve generating a notification to the user indicating the eligibility for a reclamation request for each of the portions of the transaction determined to be eligible at 312. In some embodiments, the notification may include any reclamation information identified. For example, the notification may be generated to include an indication of any items involved in the transaction for which the user is eligible to reclaim a portion of the amount paid as well as the amount for which the user is eligible to reclaim. The notification may also be generated to include instructions related to making a reclamation request in accordance with the region that the transaction is conducted in. For example, if the region requires that the user present a voucher generated by the merchant upon exiting the region in order to make a reclamation request, then the notification may include instructions to the user to obtain a voucher. Additionally, the notification may include instructions to the merchant requesting a voucher. In some embodiments, these additional instructions may be provided in a language specific to, or at least used in, the region in which the transaction is being conducted. This enables the user to communicate with the merchant to obtain a voucher even if the user does not speak the language that the region uses to communicate.

At 318, the process may involve providing the generated notification to the user. In some embodiments, the system may identify a mobile device associated with the user, and may provide the notification to that mobile device (e.g., via a short messaging service (SMS)). In some embodiments, a mobile device operated by the user may have installed upon it a mobile application supported by the service computer. In these embodiments, the mobile device may be provided the notification via a push notification to the mobile application. In some embodiments, the notification may not be provided to the mobile device until an authorization response message is received which indicates that the transaction is approved.

At 320, the process may involve appending the transaction, or portions thereof, to a transaction set for a resource provider. In some embodiments, the system may maintain, for each of a number of resource providers, information to be included on a voucher for that resource provider. For example, a transaction set may be separately maintained for each merchant that a user visits within a region during a single trip. In some embodiments, a voucher may be generated for each merchant from its respective transaction set. The generated voucher for each merchant may include an aggregate of each of the transactions conducted at that merchant, which may be generated automatically (e.g., without user interaction) by the service provider.

In some embodiments, the system may detect a potential egress event associated with a user for which monitoring has been initiated at 322. In some embodiments, this may involve determining that the user, or at least a mobile device associated with the user, is approaching a potential egress location. For example, the user may be approaching an airport. In some embodiments, this may involve determining that a scheduled egress data is approaching. For example, the system may receive an indication from the user of a departure date. In this example, the system may request a departure date from the user (e.g., upon detecting a trigger event as described above). Alternatively, the user may independently provide the departure date to the system (e.g., by logging into a mobile application and indicating a departure date). In some embodiments, the system may detect a potential egress event when a user approaches an egress location on an indicated departure date.

At 324, the process may involve identifying an egress location (or egress point) associated with the potential egress event. For example, upon determining that the user is approaching an airport or train station, the system may determine that the airport or train station is the egress location. The process may involve identifying reclamation request rules/procedures specific to the identified egress location at 326 and generating instructions to a user for making a reclamation request at 328. For example, a reclamation request may be required to be filed with an appropriate reclamation authority. In this example, the system may identify a location of that reclamation authority within the egress location and may generate routing information to guide the user to that reclamation authority. In some embodiments, rules and/or procedures for a particular egress location may include a separate process to be followed. For example, for a particular egress location, making a reclamation request may require that the user electronically provide a picture of the user's boarding pass to the reclamation authority along with any relevant vouchers. In some cases for this example, the reclamation authority may approve the reclamation request without requiring the user to visit the reclamation authority. In some other cases, the reclamation authority may wish to physically inspect one or more items for which the reclamation request is being made. In these cases, the user may subsequently be provided with instructions to visit the reclamation authority.

At 330, the process may involve providing the generated instructions to the user's mobile device. In some embodiments, the instructions may be provided in series. For example, the mobile device may first be provided with instructions guiding the user to a reclamation authority.

Upon determining that the user has arrived at the reclamation authority, instructions may be provided for submitting the reclamation request.

In some embodiments, the service computer may automatically request an electronic voucher from a computing device associated with the resource provider of the transaction. For example, upon determining that the transaction is in compliance with one or more rules at 312, the service computer may generate a request for a voucher. In some cases, this may involve identifying a template or format used by the identified resource provider and populating an instance of that template with information specific to the transaction. The service computer may then transmit the request to the resource provider via a network connection. The service computer may receive a voucher generated by the resource provider in response to that transmission. In some embodiments, the resource provider may be configured to automatically generate a voucher for each transaction. Upon determining that a particular type of payment device was used in the transaction, the resource provider may be configured to transmit the generated voucher to a transaction processing network associated with that payment device. The service computer, which may be in communication with the transaction processing network, may receive the generated voucher and may match it to the transaction. The service computer may then store the voucher in association with the user and/or the resource provider.

Figure 4:
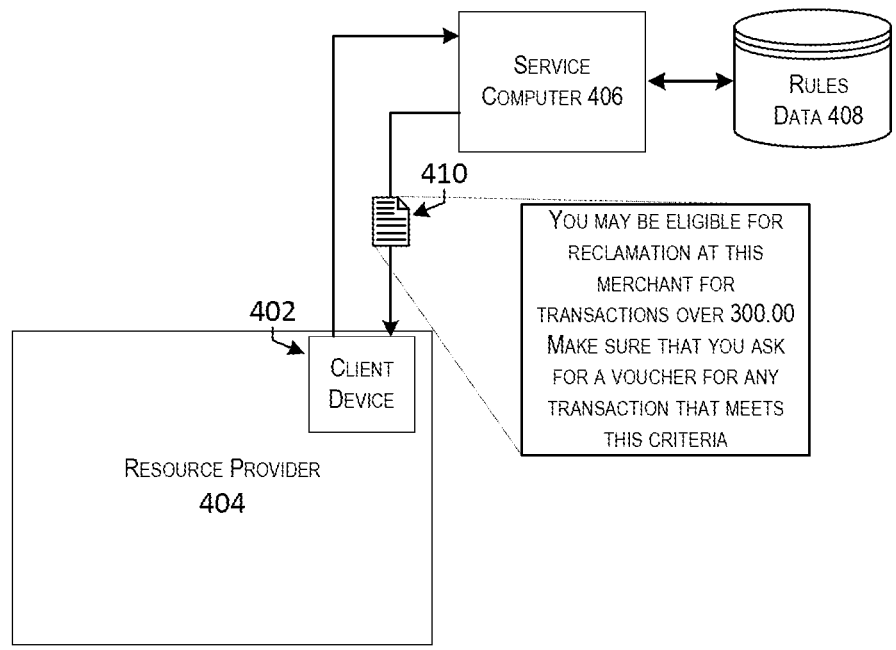
FIG. 4 depicts an illustrative example of a notification technique which may be implemented in accordance with at least some embodiments.

FIG. 4 depicts an illustrative example of a notification technique which may be implemented in accordance with at least some embodiments. In FIG. 4, a user operating a client device 402 may enter a geographic location associated with a resource provider 404 (e.g., a retail store). The client device 402 may be in communication with a service computer 406.

In some embodiments, the client device 402 may report location information (e.g., global positioning system (GPS) coordinates) to a service computer 406. The service computer 406 may determine, from the received location information, that the client device 402 is located within a geographic location operated by the resource provider 404. In accordance with at least some embodiments, the service computer 406 may, upon identifying the resource provider 404, determine whether transactions conducted at resource provider 404 are eligible for reclamation. In some embodiments, this may involve checking a database of resource providers which are eligible to determine whether the resource provider 404 is included.

Upon determining that the resource provider 404 is eligible for reclamation, the service computer 406 may query rules data 408 to identify a set of rules that may apply to transactions conducted at the resource provider 404. Rules data 408 may be an example of rules data 226 depicted in FIG. 2. In some embodiments, the service computer 406 may identify any eligibility requirements based on the identified rules. For example, if a rule indicates that transactions over $300.00 are eligible for reclamation, then the service computer 406 may determine that the transaction being greater than $300.00 is an eligibility requirement. The service computer may then generate a notification 410 to the client device that indicates that transactions at resource provider 404 are eligible for reclamation. In some embodiments, the notification 410 may also include an indication of any identified eligibility requirements. Using the example above, the notification 410 may state "You may be eligible for reclamation at this merchant for transactions over 300.00. Make sure that you ask for a voucher for any transaction that meets this criteria."

In some embodiments, the service computer 406 may determine that the user cannot meet the eligibility requirements for reclamation based on the rules. For example, a rule may make reclamation eligibility contingent on the user belonging to a particular class. In this example, the service computer may determine that the user does not belong to the particular class and hence is not eligible for reclamation. In these embodiments, the notification 410 may be suppressed.

Figure 5:
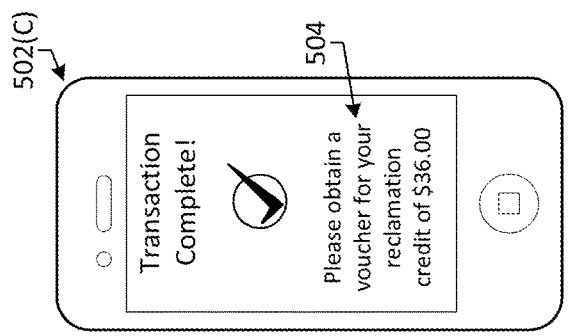
FIG. 5 depicts some example notifications that may be provided to a user upon determining that one or more items in a transaction conducted by the user includes reclamation-eligible material in accordance with at least some embodiments.
Figure 5:
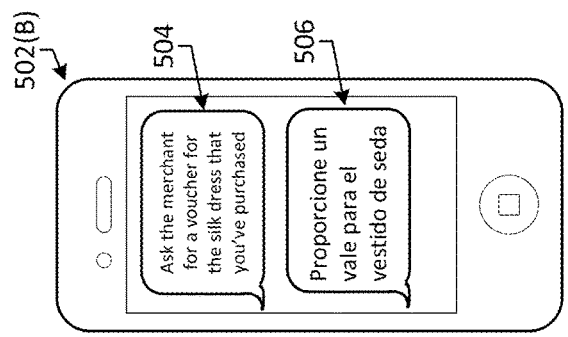
Figure 5:
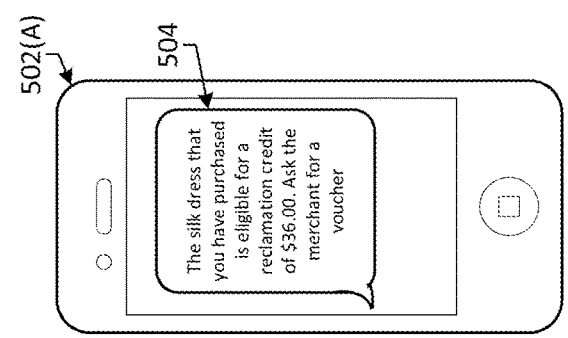

FIG. 5 depicts some example notifications that may be provided to a user upon determining that one or more items in a transaction conducted by the user includes reclamation-eligible material in accordance with at least some embodiments. In some embodiments, a user may be associated with a payment device (e.g., a credit card or other payment account), which must be routed to an authorization entity via a transaction processing network to complete a transaction. In these embodiments, the user may also be associated with a client device 502, such as a mobile phone. In some embodiments, the payment device may be implemented on the client device 502.

In FIG. 5, client device 502(A) and client device 502(B) illustrate embodiments in which a payment device may be used separately from the client device 502, whereas client device 502(C) illustrates at least one embodiment in which the payment device may be implemented in a mobile device installed upon the client device 502. Accordingly, client device 502(A) and client device 502(B) illustrate embodiments in which a notification 504 is received via a messaging service whereas 502(C) illustrates at least one embodiment in which the notification 504 is received within a graphical user interface (GUI) of the mobile application. It should be noted that the examples provided are not intended to be limiting and one skilled in the art would recognize a number of other suitable techniques for providing notifications to a client device, each of which should be considered an equivalent of those described.

In each of the depictions of client device 502(A), client device 502(B), and client device 502(C), a notification 504 may be provided to instruct the user to obtain a voucher. In some embodiments, the notification 504 may be generated as soon as a transaction conducted by the user has been authorized or approved. This will cause the client device to receive the notification 504 while the user is still at the point of sale and gives the user the ability to request a voucher. The notification 504 may include a number of details pertaining to the transaction. For example, the notification 504 may include an indication of a particular item that is eligible for reclamation, a particular amount, or any other suitable information. In some embodiments, the system may determine that a prominent language of the region in which the resource provider is located is different from a native language of the user. In these embodiments, the user may be provided with a second notification 506 in the region's prominent language. In some cases, this notification will be directed toward an agent of the resource provider (e.g., a clerk), to instruct that agent to provide a voucher. It is envisioned that the second notification 506 may prevent complications due to language barriers. Although FIG. 5 illustrates embodiments in which a user is notified to request a voucher, it should be noted that in some embodiments of the disclosure, the service computer may automatically obtain a voucher. For example, in some embodiments, the service computer may generate a voucher. In another example, the service computer may request a voucher from a resource provider computer upon detecting a transaction and may receive a voucher generated by that resource provider computer.

Figure 6:
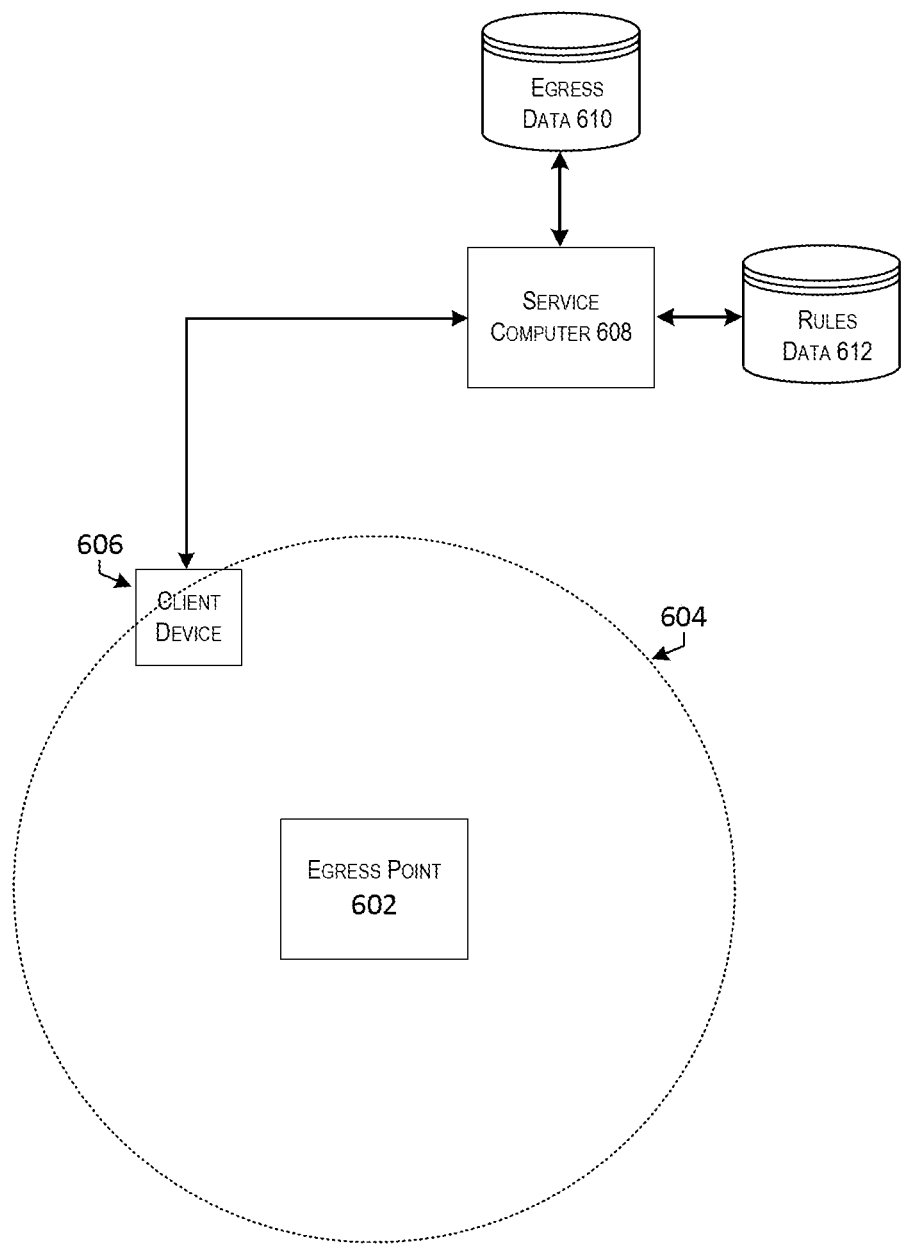
FIG. 6 depicts an illustrative egress event detection technique that may be implemented in accordance with at least some embodiments.

FIG. 6 depicts an illustrative egress event detection technique that may be implemented in accordance with at least some embodiments. In FIG. 6, an egress point 602 is depicted as a geographic location. The egress point 602 may be any suitable geographic locale that provides a means of departing a region in which the egress point 602 is located. In accordance with at least some embodiments, an egress point 602 may include a number of terminals and/or shops. For example, an egress point may be an airport that includes a number of terminals as well as restaurants and merchants. The egress point 602 may also include a reclamation authority, such as a customs office.

In some embodiments, the egress point 602 may contain one or more beacons for creating a virtual perimeter 604. A beacon is a device capable of transmitting a code to a client device 606, typically via Bluetooth Low Energy (BLE). The client device 606 may report its vicinity to the beacon or use the code to determine its location. The beacons may be used to detect a user that enters the perimeter 604, or comes within geographic range (e.g., defined by the perimeter 604 or some portion of the perimeter 604) of the egress point 602. For example, a client device 606 that is associated with a particular user may indicate that it is within the vicinity of three particular beacons. In this example, a distance (or relative distance) to each of the three beacons may be used to pinpoint that user's location.

In some embodiments, the system may employ regional monitoring techniques (e.g., geo-fencing). Geo-fencing is the use of GPS or RFID technology to create a virtual geographic boundary, enabling software to trigger a response when a client device 606 enters or leaves a particular area. In accordance with at least some embodiments, the service computer 608 may identify a number of potential egress points in the vicinity of a client device 606, and may provide location data for those potential egress locations to the client device 606. In some embodiments, a mobile application on the client device 606 may cause the client device to calculate a virtual perimeter 604 surrounding each of the locations. If the client device 606 detects that it has crossed one of those virtual perimeters 604 (e.g., based on its GPS coordinates), the client device 606 may report to the service computer 608 that it is approaching a particular egress point 602 associated with the virtual perimeter 604 that it crossed.

In some embodiments, once the service computer 608 has determined that the client device 606 is approaching an egress point 602, the service computer 608 may determine whether an egress event is likely. In some embodiments, the service computer 608 may determine if an egress date is approaching. In some embodiments, the service computer 608 may provide a notification to the client device 606 to request an indication as to whether or not an egress event if likely. For example, the service computer may provide a notification to the client device 606 in which the user is requested to answer whether the use is about to depart the current region.

Once the service computer 608 has determined that an egress event is forthcoming that involves the egress point 602, the service computer 608 may identify a reclamation authority location from egress data 610 and/or reclamation rules/procedures from rules data 612, which are specific to the egress point 602. In some embodiments, the service computer 6 may, upon determining a reclamation authority location from egress data 610, generate and provide routing instructions intended to guide the user to the reclamation authority location. The routing instructions may include graphical instructions (e.g., a map), textual instructions, or some combination of the two. In some embodiments, the service computer 608 may use GPS coordinates of the client device 606 in generating routing instructions. Routing instructions may be generated dynamically, in that they may be updated as new information is received.

Additionally, the service computer 608 may also generate instructions for making a reclamation request based on rules and/or procedures identified from rules data 612. For example, the service computer 608 may identify procedures related to making a reclamation request for a particular egress point 602, a particular region in which the transaction(s) has been conducted, a particular class to which the user belongs, an amount associated with the transaction(s), a particular class of item involved in the transaction(s), and/or any other suitable criteria. The service computer 608 may generate specific instructions for making a reclamation request from these identified rules. For example, upon determining that the rules for a region require physical inspection for any item valued at more than $300.00, the service computer may identify each item that fits this criteria and generate instructions to present those items to the reclamation authority agent. In some embodiments, the instructions may require that a user take pictures of one or more items, take a picture of his or her boarding pass, and transmit the pictures to a reclamation authority. In these embodiments, the service computer 608 may independently transmit any relevant vouchers to the reclamation authority and the user may not be required to visit the reclamation authority unless the reclamation authority indicates that they would like to physically inspect the goods. In some embodiments, the service computer 608 may enable this functionality via a mobile application installed upon the client device 606. For example, the service computer 608 may, upon detecting an egress event, provide an instruction to the client device 606 (e.g., a push notification). In this example, a mobile application may be caused by the instruction to execute on the client device 606. The mobile application may then cause the client device 606 to communicate with the service computer 608 and to convey the instructions generated by the service computer 608 to the user. It should be noted that, in at least some embodiments, the service computer 608 may also maintain contact information for each reclamation authority at each potential egress location. In these embodiments, the user need not communicate with the reclamation authority directly (e.g., the user need not know the contact information) as the service computer 608 may be configured to route communications between the user and the reclamation authority.

Figure 7:
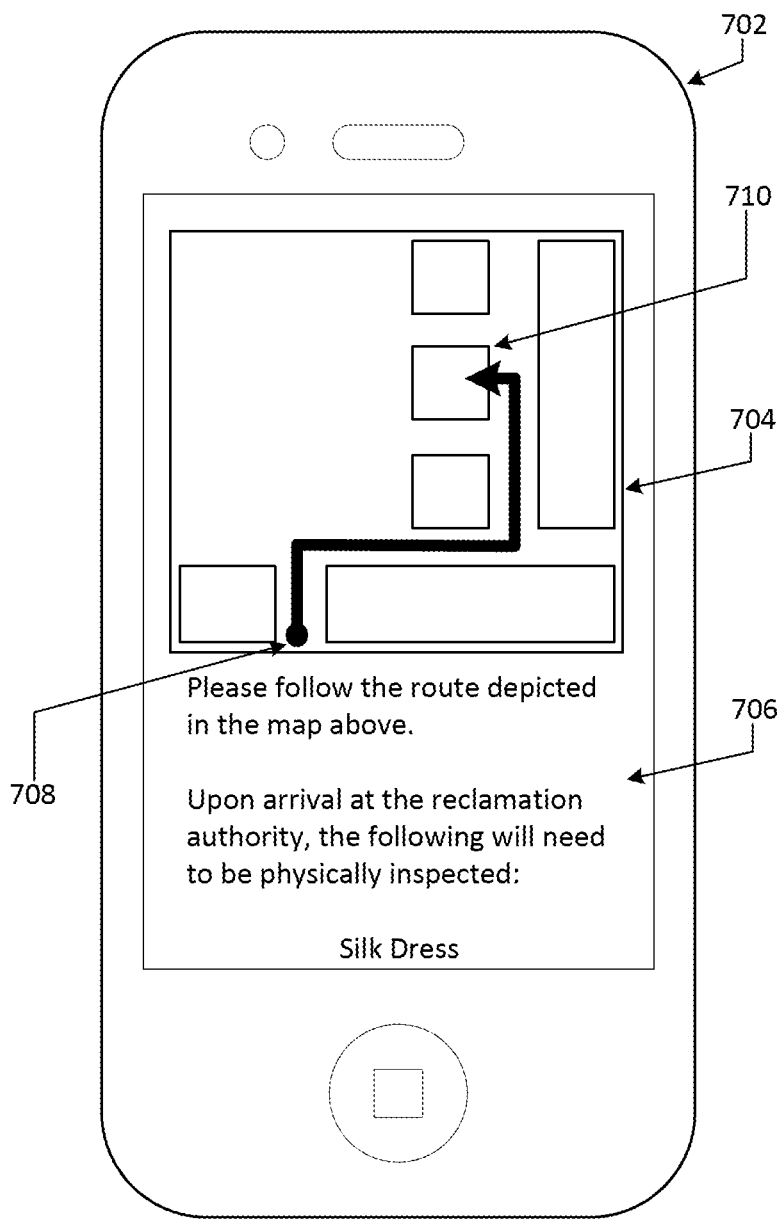
FIG. 7 depicts an illustrative example of routing instructions that may be provided to a client device in accordance with at least some embodiments.

FIG. 7 depicts an illustrative example of routing instructions that may be provided to a client device in accordance with at least some embodiments. Routing instructions may include any suitable set of instructions intended to facilitate a user in making a reclamation request. As described above, routing instructions may be graphical, textual, or some combination of graphical and textual. FIG. 7 depicts an example of a client device 702 having been provided with routing instructions that include both graphical instructions 704 and textual instructions 706.

In some embodiments, graphical instructions 704 may include a map or other suitable graphical guidance means. For example, graphical instructions 704 may include a map that depicts a current location of the user 708, a location of the reclamation authority 710, and/or a route between the two. It should be noted that there are a number of other ways to provide graphical means of guiding a user, as would be appreciated by one skilled in the art.

In some embodiments, textual instructions 706 may include any text-based instructions. In some embodiments, the textual instructions 706 may include instructions to make available certain items for physical inspection. In some embodiments, the textual instructions 706 may include instructions to capture an image of one or more items. It should be noted that the graphical instructions 704 and/or textual instructions 706 may be dynamically generated using information for a specific egress location. For example, in some embodiments, the instructions may include an indication of a current wait time associated with the reclamation authority.

Figure 8:
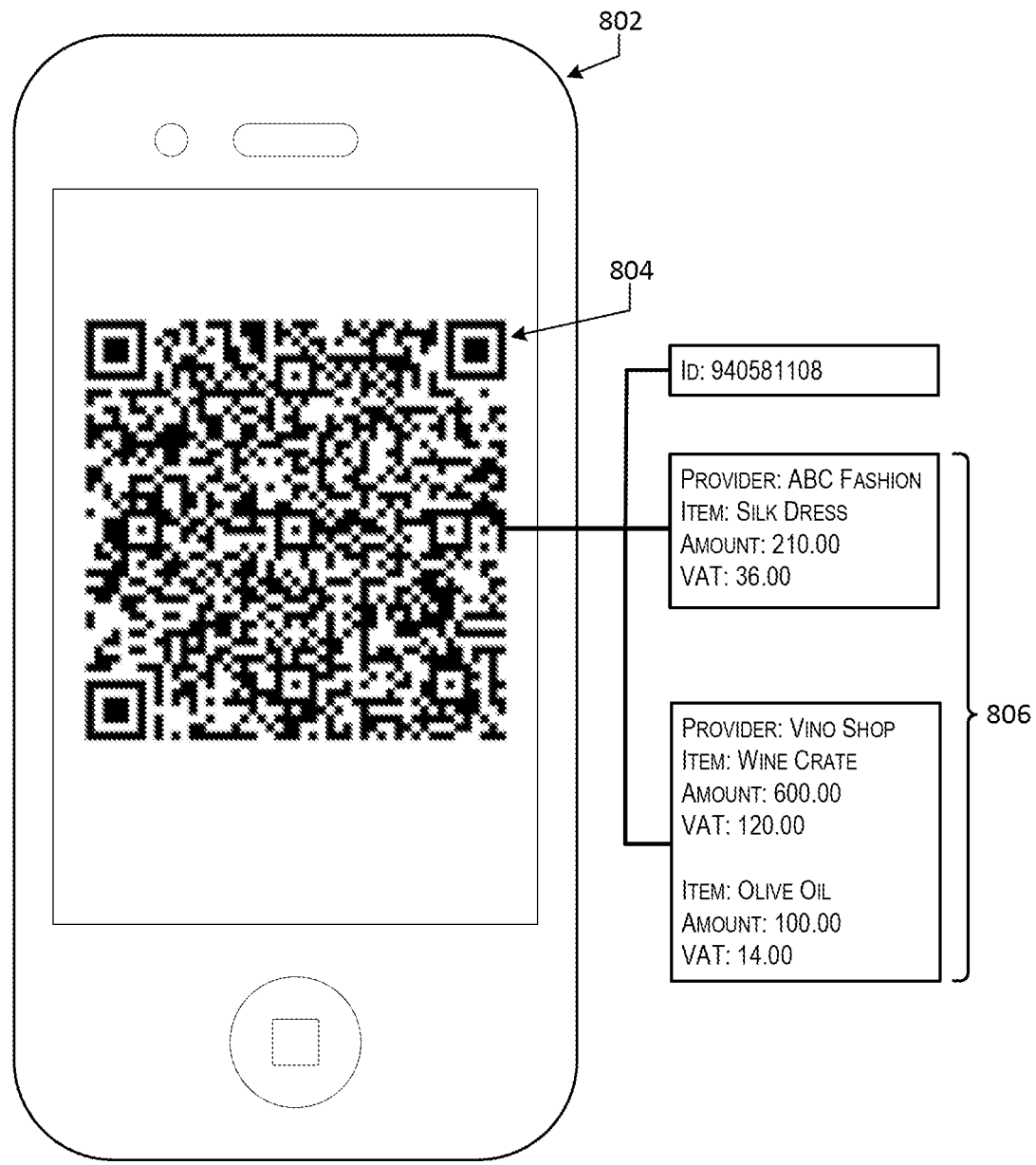
FIG. 8 depicts an illustrative example of a technique for submitting a reclamation request via a machine readable code in accordance with at least some embodiments.

FIG. 8 depicts an illustrative example of a technique for submitting a reclamation request via a machine readable code in accordance with at least some embodiments. As described above, in some embodiments of the disclosed system, a service computer may track reclamation-eligible transactions generating and/or collecting from resource providers electronic vouchers for those transactions.

In FIG. 8, the service computer, upon receiving an indication that an egress event is to occur, may generate a machine readable code 802 (e.g., a barcode, QR code, or any other suitable machine-readable data format) associated with information for each of the reclamation eligible transactions that the user has conducted, which the service computer may provide to a client device 804 In some embodiments, the machine-readable code may include voucher information 806 for each of the transactions. For example, upon scanning the machine-readable code, a computing device may be capable of parsing or reformatting the information obtained from the machine-readable code to identify the voucher information 806. In some embodiments, the machine-readable code may include an identifier that may be used to retrieve the transaction information. For example, upon scanning the machine-readable code, a computing device may receive an identifier. The computing device may then communicate the received identifier to the service computer and the service computer may, in turn, provide the voucher information 806 in a response.

Figure 9:
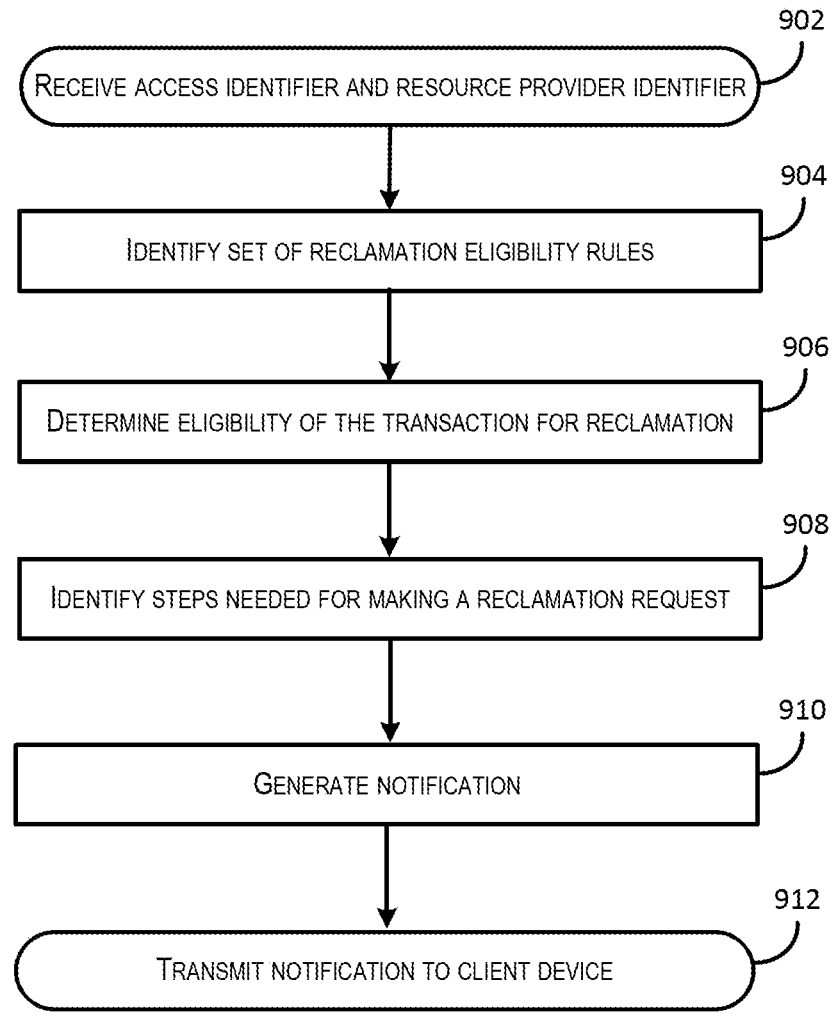
FIG. 9 depicts an illustrative flow diagram depicting an example process for providing a reclamation eligibility notification to a client device in accordance with at least some embodiments.

FIG. 9 depicts an illustrative flow diagram depicting an example process for providing a reclamation eligibility notification to a client device in accordance with at least some embodiments. In accordance with at least some embodiments, the process 900 may be performed by a service computer (e.g., the service computer 202 depicted in FIG. 2).

In some embodiments, process 900 may begin at 902, when an access identifier and a resource provider identifier are received. In some embodiments, an access identifier may be any identifier capable of being used to identify an access credential (e.g., a credit card number or other account number). A resource provider identifier may be any identifier capable of being used to identify a particular resource provider (e.g., a merchant identifier). In some embodiments, the access identifier and the resource provider identifier may be received within a transaction request. For example, the process 900 may be implemented via a service computer in communication with a transaction processing network. In this example, the transaction processing network may receive an authorization request message from the resource provider that includes the identifiers, and may convey that authorization request message to the service computer. Accordingly, the service computer may receive information on each transaction conducted via a transaction processing network and may implement the process 900 automatically (e.g., without user interaction).

At 904, the process 900 may involve identifying a set of reclamation eligibility rules that may be applicable for a transaction. In some embodiments, this may involve identifying one or more rules applicable to a particular region in which the transaction is being conducted, a particular class to which the user belongs, a particular resource provider or type of resource provider at which the transaction is being conducted, or any other suitable criteria. In this way, the service computer may identify a set of reclamation eligibility rules that are potentially relevant to the transaction being conducted.

At 906, the process 900 may involve determining an eligibility of the current transaction based on the identified set of reclamation eligibility rules. This may involve comparing attributes of the transaction to each of the rules in the identified set of reclamation eligibility rules. In some embodiments, one or more of the rules in the identified set of reclamation eligibility rules may include some threshold value that a transaction must meet to be eligible. For example, a rule of the identified set of reclamation eligibility rules may require that a transaction be for an amount greater than or equal to some threshold amount in order to be eligible. In some embodiments, one or more of the rules in the identified set of reclamation eligibility rules may indicate an item or type of item which is eligible or ineligible. For example, a rule of the identified set of reclamation eligibility rules may indicate that food items are ineligible. In this example, the service computer may determine eligibility for each non-food item in the transaction.

At 908, the process 900 may involve identifying one or more steps needed for making a reclamation request. In some embodiments, the one or more steps may be steps to be taken by a user wishing to make a reclamation request. For example, in some situations, a user may be required to collect vouchers for each eligible transaction from the resource provider at which the transaction was conducted. In this example, the service computer may determine that the one or more steps includes obtaining a voucher from the resource provider of the current transaction.

At 910, the process 900 may involve generating a notification. The notification may include language indicating that the transaction is eligible for reclamation. In some embodiments, the notification may also include an indication of the one or more steps identified at 908. For example, the notification may include an indication that the user should obtain a voucher for the current transaction (or a portion thereof) from an agent of the resource provider for the current transaction.

At 912, the process 900 may involve transmitting the generated notification to a client device. In some embodiments, the service computer may maintain an association between one or more client device identifiers (e.g., phone numbers) and one or more access identifiers. In these embodiments, the service computer may, upon generating a notification for a transaction at 910, identify a client device associated with the access identifier based on the maintained association and transmit the notification to that client device. In some embodiments, the notification may be transmitted to a client device via a mobile application installed upon the client device (e.g., via a push notification). Note that it is intended that the notification be provided to the client device as quickly as possible in order to provide the user with instructions to provide a voucher before he or she leaves the resource provider location, and before the user moves away from a point of sale terminal or access device. Hence, in some embodiments, the notification is transmitted to the client device while the client device is proximate to the access device (e.g., a point of sale terminal).

In some embodiments, the process 900 may further involve receiving an itinerary associated with the access identifier, generating further notification messages at different points in the itinerary, and transmitting the notification messages to the client device. For example, the service computer may receive an indication of various dates/times that the user will be traveling as well as destination data. In this example, the service computer may identify changes in reclamation eligibility throughout the user's scheduled itinerary and may provide notifications when that reclamation eligibility changes. By way of illustration, the user may travel from a first geographic locale to a second geographic locale. The service computer may determine, based on rules associated with each of the locales, that the eligibility requirements are different for the second locale and may provide a notification that indicates the new eligibility requirements to the user's client device.

Figure 10:
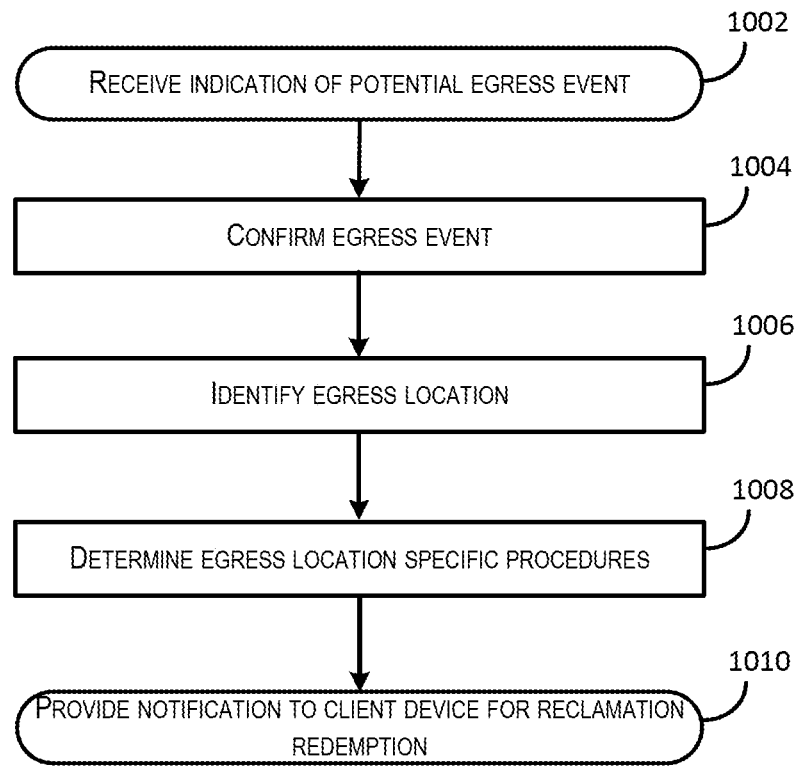
FIG. 10 depicts an illustrative flow diagram depicting an example process for identifying an egress event and providing a notification to a client device in accordance with at least some embodiments.

FIG. 10 depicts an illustrative flow diagram depicting an example process for identifying an egress event and providing a notification to a client device in accordance with at least some embodiments. In accordance with at least some embodiments, the process 1000 may be performed by a service computer (e.g., the service computer 202 depicted in FIG. 2).

In some embodiments, process 1000 may begin at 1002, when an indication is received of a potential egress event. In some embodiments, an indication of a potential egress event may be received in response to determining that a client device associated with a user is approaching an egress location. In some embodiments, an indication of a potential egress event may be received in response to determining that a departure date/time is approaching.

At 1004, the process 1000 may involve confirming the potential egress event. In some embodiments, the potential egress event may be confirmed upon determining that the user is approaching an egress location and that a scheduled departure is approaching (e.g., two-factor confirmation). In some embodiments, upon detecting a potential egress event, the process may involve providing a notification to a client device asking a user for confirmation. In these embodiments, the potential egress event may be confirmed upon receiving a response from the user.

At 1006, the process 1000 may involve identifying an egress location to be associated with the identified egress event. In some embodiments, the egress location may be a location which has previously been indicated by the user. For example, the user may provide an itinerary for his or her trip, which includes scheduled departure dates/times as well as egress locations. In some embodiments, the egress location may be identified based on the client device approaching an egress location. In these embodiments, the identified egress location may be the egress location being approached.

At 1008, the process 1000 may involve determining one or more procedures specific to the identified egress location. In some embodiments, the service computer may identify some point within the egress location at which a reclamation authority is located. In these embodiments, the service computer may generate instructions intended to guide the user to that reclamation authority. In some embodiments, the service computer may identify specific procedures for making a reclamation request at a particular egress location. For example, the service computer may identify specific rules that must be followed by the user. These specific rules may involve the types of items that must be physically inspected, how inspections are to occur, how proof of departure is to be provided to the reclamation authority, etc.

At 1010, the process 1000 may involve generating and providing a notification to the client device. In some embodiments, the notification may include routing information intended to provide information related to traversing to the reclamation authority. In some embodiments, the notification may include an indication of one or more identified specific rules that must be followed by the user. In some embodiments, the notification may include information specific to the reclamation authority (e.g., a current wait time associated with the reclamation authority). In some embodiments, a number of notifications may be generated and provided leading up to the successful submission of a reclamation request by the user. In some embodiments, the notification may include a machine-readable code that, when scanned by the reclamation authority, provides access to one or more electronic vouchers. In some embodiments, the reclamation authority may be provided with an access identifier (e.g., a payment device) used in conducting one or more transactions. In at least some of these embodiments, any reimbursed reclamation amount may be credited to an account associated with that access identifier.

Figure 11:
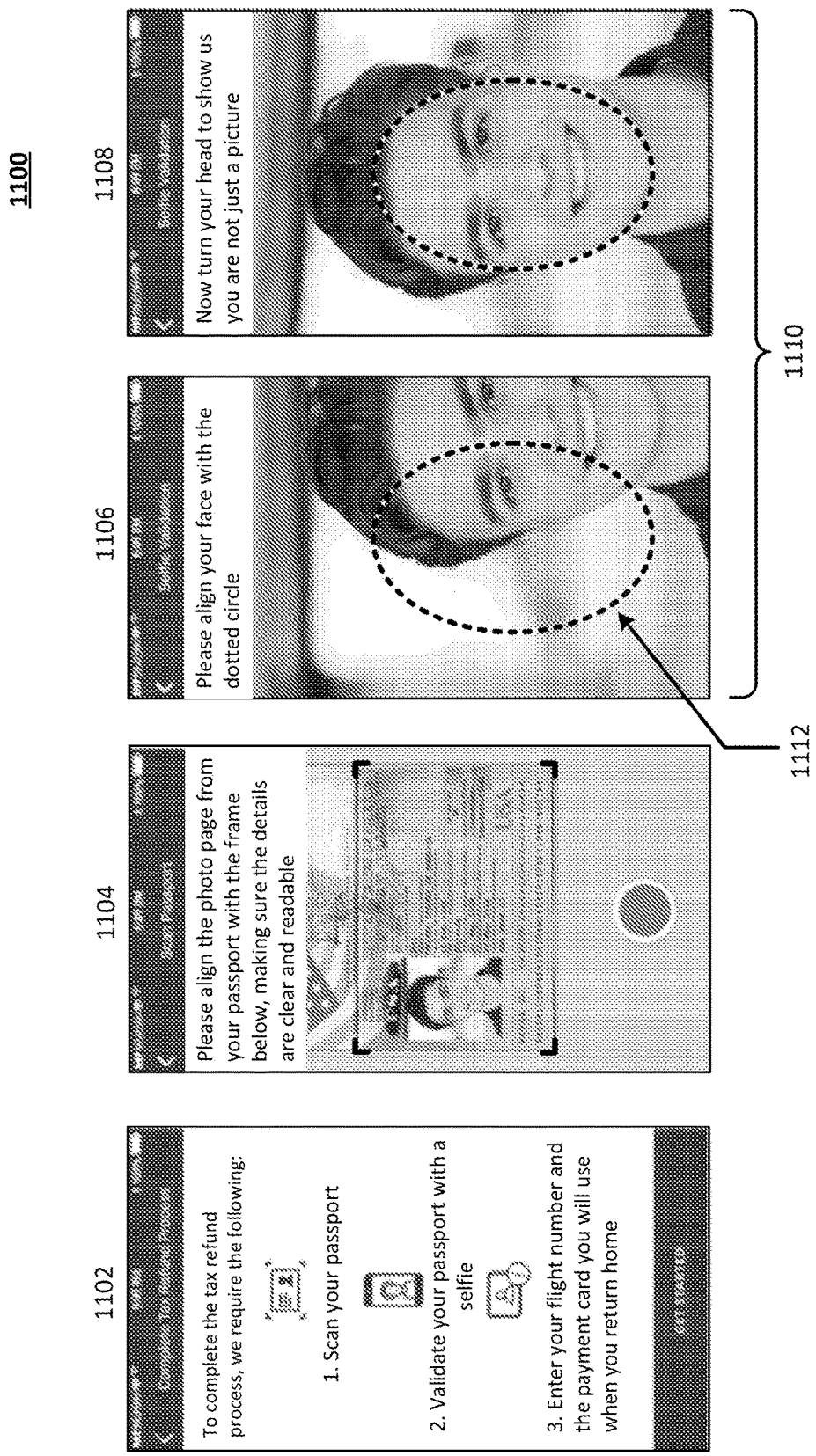
FIG. 11 depicts an illustrative process for providing authentication when making an automated reclamation request via a client device in accordance with at least some embodiments.

FIG. 11 depicts an illustrative process for providing authentication when making an automated reclamation request via a client device in accordance with at least some embodiments. The process 1100 is depicted as a series of graphical user interfaces (1102-1108) presented via the client device, which may be an example of client device 204 depicted in FIG. 2. It should be noted that the graphical user interfaces presented by way of illustration in FIG. 11 (and FIG. 12 below) are representative of instructions received from a service computer. In other words, while the examples are depicted as being presented on a client device, it would be understood by one skilled in the art that at least a portion of the functionality used to generate the example graphical user interfaces may be implemented remotely on a service computer.

During a first portion of an automated reclamation request process, a user, and an egress event for that user, may be authenticated. In some embodiments, the process 1100 may involve presenting an overview graphical user interface (GUI) 1102 that outlines the requirements of the process. In some embodiments, the process may involve collection of one or more documents related to the user and/or the egress event. For example, as depicted at 1104, the client device may be instructed to request documentation associated with the user and/or egress event to be authenticated (such as a passport, airline ticket, etc.). In some embodiments, this may involve capturing an image of a document to be provided. In some embodiments, this may involve retrieving an electronic document stored in memory of the client device. By way of illustration, the client device may instruct a user to take a photo of a document, which may then be conveyed to the service computer.

In some embodiments, the process may involve authenticating the user of the client device via a "selfie validation" subprocess 1110. In subprocess 1110, the user may be asked to take a picture of himself/herself via a camera installed on the client device. As depicted in 1106, the user may be asked to position the client device so as to align an image of his or her face within some area 1112 of the GUI. In some embodiments, the subprocess 1110 may also instruct the user to perform some action which will confirm that the image is of the user's face and not of another image. For example, the user may be asked to turn his or her head, blink, nod, or perform any other suitable action. Upon capturing the image of the user, and upon verifying that the image is of the user's face, the client device may append metadata to the image that may be used to identify a location and time at which the image has been taken. For example, the client device may append a timestamp and global positioning system (GPS) coordinates to the image. The process 1100 may then involve providing the captured image to a service computer. Using this process, the service computer may verify a user and the user's current location, which may then be used to verify an egress event. In some embodiments, a face of the user in the image may be compared to facial information depicted on a document (e.g., a passport).

Figure 12:
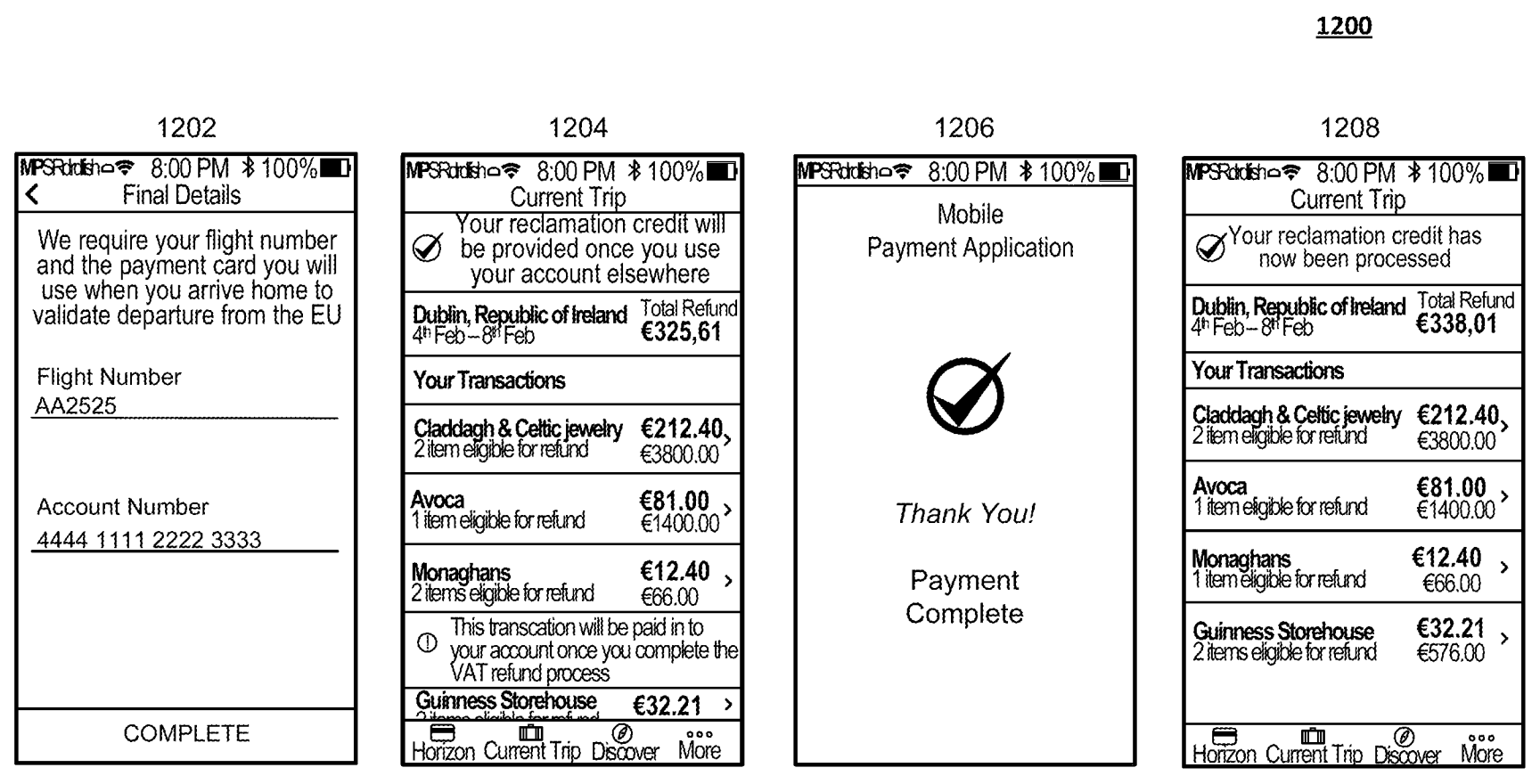

FIG. 12 depicts an illustrative process for obtaining reclamation credit in an automated reclamation request via a client device in accordance with at least some embodiments. The process 1200 is depicted as a series of graphical user interfaces presented via the client device, which may be an example of client device 204 depicted in FIG. 2. In some embodiments, process 1200 may continue from process 1100 described above. As described elsewhere, a service computer may be configured to generate vouchers and track total reclamation credits for a user on a merchant-by-merchant basis. While some embodiments are described herein in which a user may visit a reclamation authority to claim those reclamation credits, some embodiments may involve automatic reclamation. It should be noted that most jurisdictions require proof that the user is leaving, or has left, the country prior to providing those reclamation credits.

In some embodiments, the process 1200 may involve requesting information to be used in the reclamation process from a user. For example, as depicted at 1202, the process may involve requesting egress information (e.g., a flight number or other suitable departure information) and/or an account number. The account number may be used to provide reclamation credits to the user as well as to verify that the user has exited the jurisdiction from which he or she wishes to obtain reclamation credit.

As depicted at 1204, a user may be presented with a summary of reclamation credits for which he or she is eligible. In some embodiments, the eligible credits may be presented on a merchant-by-merchant basis. In some embodiments, each summary of reclamation credits may be generated based on information received by a service computer as described elsewhere. The user may also be provided with a notification that the reclamation credits will be provided once the provided account number is used outside of the current jurisdiction.

At 1206, a user may utilize a payment application on his or her mobile device to complete a transaction outside of the jurisdiction for which reclamation credit is requested. In some embodiments, the service computer may verify, via such a transaction, that the user has left the jurisdiction and is now eligible for the reclamation credit. Upon detecting that transaction, and upon authenticating the user of the transaction, the service computer may initiate completion of the reclamation credit process. The user may be provided with a notification that one or more requests for reclamation credit have been processed, as depicted at 1208.

Figure 13:
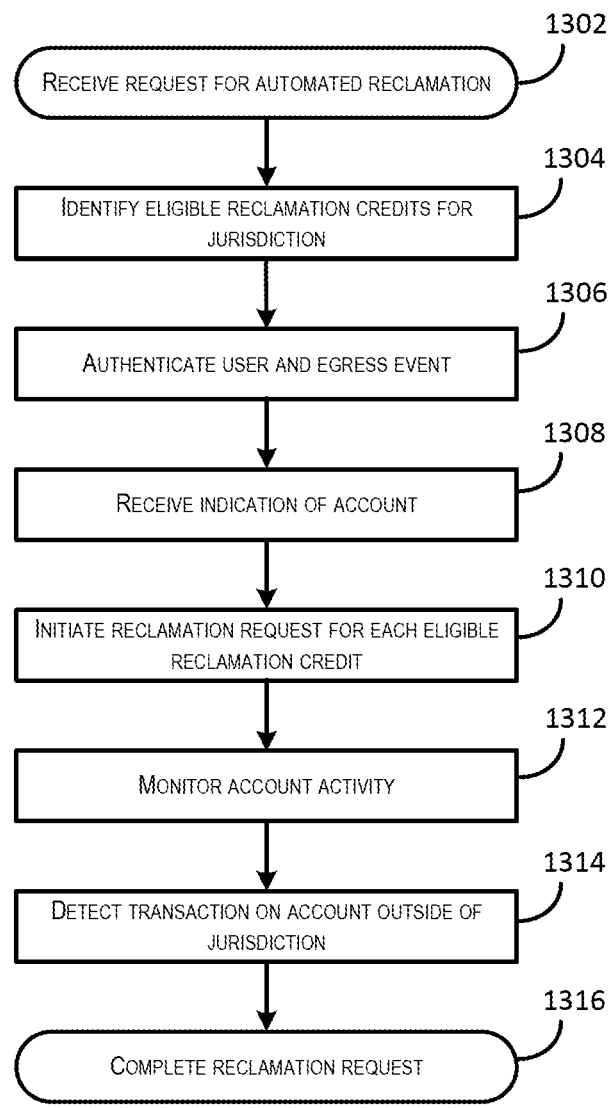
FIG. 13 depicts a flow diagram illustrating a process for completing an automated request for reclamation credit in accordance with at least some embodiments.

FIG. 13 depicts a flow diagram illustrating a process for completing an automated request for reclamation credit in accordance with at least some embodiments. The process 1300 may be performed by a service computer, such as the service computer 202 described with respect to FIG. 2.

Process 1300 may begin at 1302, when a request is received to complete an automated reclamation reimbursement. In some embodiments, the request may be initiated by a user. For example, a user may select an option on his or her mobile device to initiate the reimbursement process. In some embodiments, the request may be received automatically (e.g., without user interaction). For example, the request may be generated upon detecting that the user has entered, or is approaching, a point of egress. In another example, the reimbursement process may be initiated upon detecting that a user's time of departure is approaching or has arrived (e.g., a flight time).

At 1304, the process 1300 may involve identifying eligible reclamation credits for a current jurisdiction. In some embodiments, this may involve identifying a set of reclamation eligibility rules for the jurisdiction. The reclamation eligibility rules may include an indication of one or more resource providers, product types, prices, or any other suitable factor that may qualify for reclamation credit as well as an amount of credit qualified for. The process may then involve identifying transactions conducted by the user within the jurisdiction (e.g., via authorization requests received for the user). Each of the identified transactions may then be assessed in light of the reclamation eligibility rules for the jurisdiction to determine whether, and to what extent, the transaction qualifies for a reclamation credit. In some embodiments, transactions may be aggregated by resource provider. In some embodiments, the process may involve generating an electronic voucher for each transaction and/or resource provider.

At 1306, the process 1300 may involve authenticating the user as well as that the user is leaving, or has left, the jurisdiction (e.g., an egress event). An example of such a process for authenticating the user is described above with respect to processes 1100 and 1200.

At 1308, an indication of an account identifier may be received. For example, the user may provide a bank account or credit card number to be associated with the request. In some embodiments, an indication of an account may be received prior to initiation of the reclamation reimbursement process. Upon receiving the indication of the account, the account may be linked to the reclamation reimbursement request. In some embodiments, the account may be selected by virtue of having been used to complete one or more of the transactions for which reclamation credits are being requested.

At 1310, the process 1300 may involve initiating the reclamation request. In some embodiments, this may involve submitting each of a number of electronic vouchers (e.g., for each resource provider) to an appropriate reclamation authority. In some embodiments, the process may also involve providing any obtained documentation to the reclamation authority as well. For example, the service computer may obtain an image of a user's passport and/or travel tickets and may provide those images to the reclamation authority. In some embodiments, the service computer may receive funds associated with the reclamation requests from the reclamation authority. In some cases, these funds may be held by the service computer.

At 1312, the process 1300 may involve monitoring activity of the account associated with the received account identifier. This may involve identifying authorization request messages for card-present transactions that involve the account identifier. Upon detecting that a transaction has been conducted involving the monitored account, the service computer may determine whether a location of a resource provider for the transaction lies outside of the jurisdiction at 1314. If the location of the resource provider for the transaction lies within the jurisdiction, then the service computer may continue to monitor the account. If the location of the resource provider for the transaction lies outside of the jurisdiction, then the service computer may confirm that the user has exited the jurisdiction.

At 1316, the reclamation reimbursement request may be completed by releasing the funds received from the reclamation authority into the account associated with the account identifier.

Embodiments of the invention provide for a number of technical advantages over conventional systems. For example, embodiments of the invention enable a user to receive notifications containing timely instructions for making a reclamation request. It should be noted that the timeliness of the notification is essential, as it becomes increasingly difficult to obtain necessary documents once a user has left a point of sale. Unlike conventional systems, the currently described system is able to provide notifications in a timely manner because of its communicative coupling with a transaction processing network. Hence, eligibility for reclamation can be identified while the transaction is being conducted at the point of sale automatically (e.g., without any needed interaction from the user), and notifications can be provided to the user very quickly.

Furthermore, the system enables the user to maximize reclamation claims even though the user may not be aware of specific eligibility requirements for a transaction and/or region. This significantly reduces the complexity involved in submitting reclamation requests overall. It should be noted that other solutions to the problems presented herein may require a more advanced architecture than is currently available in some regions. For example, some references disclose a system for automating tax reimbursement, in which the transaction processing network is in communication with government entity directly, which may require that the government agency be architected in a particular manner. In contrast, the current system is useable with any existing reclamation authority, and does not require architectural changes.

Additionally, the system solves a potential problem with language barriers, in that some embodiments of the system provide a notification in a region-specific language. Resource providers in various countries often employ workers that may not speak multiple languages. Additionally, a user of the system which is visiting a foreign region may not speak the native, or local, language. Hence, the user may find it difficult to communicate with an employee of the resource provider, making it difficult to describe that the user would like a voucher for particular items. Embodiments of the current disclosure are intended to alleviate these potential language issues by automatically providing a notification to the user as well as to an employee of the resource provider in separate languages.

Furthermore, the system described herein is advantageous over other systems in that tax reclamation credits may be delivered directly to an account linked to the reclamation request. This means that the user does not need to share payment account details with a tax reclaim processor (i.e., a reclamation authority) at the airport and further reduces cash handling charges for the processor, as they do not need to provide the refund as cash.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, from an access device at a service computer, an authorization request message comprising an access identifier associated with a user and a resource provider identifier associated with a transaction conducted within a jurisdiction;
   identifying, by the service computer, a set of tax reclamation eligibility rules based on attributes associated with the access identifier and the resource provider identifier, wherein the tax reclamation eligibility rules define tax refund rules for non-residents of the jurisdiction;

determining, by the service computer based on the identified set of rules, that the transaction is eligible for a tax reclamation;

generating, by the service computer, a notification message comprising a message indicating that the transaction is eligible for the tax reclamation;

transmitting, by the service computer, the notification message to a mobile communication device associated with the access identifier;

receiving, by the service computer, a request for automated tax reclamation reimbursement;

authenticating, by the service computer, an egress event from the jurisdiction upon receiving the request for automated tax reclamation reimbursement, authenticating comprising:

monitoring, by the service computer, an account associated with the access identifier by identifying card-present transactions that involve the access identifier, wherein the service computer processes transactions associated with the access identifier;

detecting, by the service computer, that a subsequent card-present transaction has been conducted involving the monitored account with a resource provider located outside of the jurisdiction; and confirming, by the service computer, that the user has exited the jurisdiction based on detecting the subsequent card-present transaction outside of the jurisdiction; and initiating completion of the automated tax reclamation reimbursement upon confirming that the user has exited the jurisdiction.

2. The method of claim 1, further comprising:

receiving, by the service computer, an itinerary associated with the access identifier;

generating further notification messages at different points in the itinerary; and transmitting, the notification messages to the mobile communication device.

3. The method of claim 1, further comprising:

receiving, from the mobile communication device associated with the access identifier, a location of the mobile communication device; and upon determining, based on the location of the mobile communication device, that the mobile communication device is at or approaching an egress location, generating and providing instructions to the mobile communication device instructing redemption of the tax reclamation.

4. The method of claim 3, wherein the instructions instructing redemption of the tax reclamation comprise routing information.

5. The method of claim 4, wherein the routing information comprises a map of the egress location.

6. The method of claim 4, wherein the routing information comprises a set of instruction that guide a user to a location of a reclaim authority agent.

7. The method of claim 1, further comprising determining, by the service computer based on the identified set of rules, a set of steps needed for redemption of the tax reclamation, wherein the notification message includes one or more steps of the set of steps.

8. The method of claim 7, wherein the one or more steps of the set of steps included in the notification message includes a step to obtain a voucher from the resource provider.

9. The method of claim 8, wherein the notification message is transmitted to the mobile communication device while the mobile communication device is proximate to the access device.

10. The method of claim 1, further comprising generating, by the service computer, an electronic voucher associated with the transaction.

11. The method of claim 1, further comprising:

generating, by the service computer, a request for an electronic voucher associated with the transaction; and transmitting, by the service computer, the request for the electronic voucher to a computing device associated with the resource provider.

12. The method of claim 11, further comprising:

receiving, by the service computer from the resource provider, the electronic voucher; and storing the electronic voucher in association with the mobile communication device.

13. The method of claim 1, wherein the notification message includes an indication of an item of the transaction.

14. The method of claim 1, further comprising:

receiving, by the service computer from the mobile communication device associated with the access identifier, GPS coordinates of the mobile communication device; and upon determining, based on the GPS coordinates of the mobile communication device, that the mobile communication device is at or approaching an egress location from a jurisdiction, generating and providing instructions to the mobile communication device instructing redemption of the tax reclamation.

15. A service computer comprising:

a processor; and a memory including instructions that, when executed with the processor, cause the processor to, at least:

receive an authorization request message comprising an access identifier associated with a user and a resource provider identifier associated with a transaction conducted within a jurisdiction;

identify a set of tax reclamation eligibility rules based on attributes associated with the access identifier and the resource provider identifier, wherein the tax reclamation eligibility rules define tax refund rules for non-residents of the jurisdiction;

determine, based on the identified set of rules, that the transaction is eligible for a tax reclamation;

generate a notification message comprising a message indicating that the transaction is eligible for the tax reclamation;

transmit the notification message to a mobile communication device associated with the access identifier;

receive a request for automated tax reclamation reimbursement;

authenticate an egress event from the jurisdiction upon receiving the request for automated tax reclamation reimbursement, authenticating comprising:

monitor an account associated with the access identifier by identifying card-present transactions that involve the access identifier, wherein the service computer processes transactions associated with the access identifier;

detect that a subsequent card-present transaction has been conducted involving the monitored account with a resource provider located outside of the jurisdiction; and confirm that the user has exited the jurisdiction based on detecting the subsequent card-present transaction outside of the jurisdiction; and initiate completion of the automated tax reclamation reimbursement upon confirming that the user has exited the jurisdiction.

16. The service computer of claim 15, wherein the instructions further cause the processor to generate and store electronic voucher information for each transaction determined to be eligible for a tax reclamation.

17. The service computer of claim 16, wherein the instructions further cause the processor to generate a machine-readable code that conveys the electronic voucher information.

18. The service computer of claim 17, wherein the machine-readable code comprises a quick response (QR) code.

19. The service computer of claim 15, wherein the set of tax reclamation eligibility rules is determined based on a region in which the transaction is being conducted.

* * * * *